United States Patent
Godfrey et al.

(10) Patent No.: US 6,450,451 B1
(45) Date of Patent: Sep. 17, 2002

(54) MULTI-PANE WINDOW PORTABLE DEFOGGING DEVICE

(76) Inventors: Deidra Moxon Godfrey, 200 Copperplate La., Peachtree City, GA (US) 30269; William Jennings Godfrey, III, 200 Copperplate La., Peachtree City, GA (US) 30269

( * ) Notice: Subject to any disclaimer, the term of this patent is extended or adjusted under 35 U.S.C. 154(b) by 0 days.

(21) Appl. No.: 09/525,548

(22) Filed: Mar. 14, 2000

Related U.S. Application Data

(60) Provisional application No. 60/157,547, filed on Oct. 4, 1999.

(51) Int. Cl.$^7$ .............................. B64C 1/14; E06B 7/00
(52) U.S. Cl. .................... 244/129.3; 244/1 R; 52/171.2; 52/171.3
(58) Field of Search .............................. 244/129.3, 1 R; 52/171.2, 171.3; 454/198

(56) References Cited

U.S. PATENT DOCUMENTS

| | | | | |
|---|---|---|---|---|
| 2,047,658 A | * | 7/1936 | Zaiger | 248/205.8 |
| 2,191,164 A | * | 2/1940 | Westling | 285/238 |
| 2,605,516 A | * | 8/1952 | Gugliotta | 52/171.3 |
| 3,452,553 A | * | 7/1969 | Dershin | 62/239 |
| 3,932,971 A | * | 1/1976 | Day | 52/171.3 |
| 4,081,934 A | * | 4/1978 | Franz | 52/171.3 |
| 4,567,703 A | * | 2/1986 | Ricks | 52/171.3 |
| 4,641,466 A | * | 2/1987 | Raninen et al. | 52/171.3 |
| 4,932,608 A | * | 6/1990 | Heidish et al. | 244/129.3 |
| 5,732,517 A | * | 3/1998 | Milikovsky | 52/171.3 |
| 5,878,538 A | * | 3/1999 | Rossini | 52/171.3 |
| 5,884,865 A | | 3/1999 | Scherer et al. | 244/129.3 |
| 5,988,566 A | * | 11/1999 | Meyer | 52/171.3 |
| 6,168,112 B1 | * | 1/2001 | Mueller et al. | 244/129.3 |
| 6,176,864 B1 | * | 1/2001 | Chapman | 606/153 |
| 6,178,250 B1 | * | 1/2001 | Brungart et al. | 381/337 |

* cited by examiner

*Primary Examiner*—Charles T. Jordan
*Assistant Examiner*—Christian M. Best

(57) ABSTRACT

A portable defogging device for defogging multi-paned windows comprising an open loop source of low moisture gas and a flexible conduit for introducing the gas into the enclosed space between the window panes. A regulator is used to introduce the fixed rate of flow of gas through the flexible conduit and into the enclosed space so as to remove the pre-existing or previous condensation in the enclosed space. In a double-paned aircraft window, the low moisture gas is introduced through a pressure equalization hole in the window. A method of defogging a multi-paned window comprising passing a low moisture gas through a flexible conduit and into an enclosed space between at least two window panes. The discharge of gas is regulated to a constant flow so as to remove moisture from the enclosed space, wherein the defogging device is deactivated and removed from the window to complete the defogging cycle.

39 Claims, 2 Drawing Sheets

MULTI-PANE WINDOW PORTABLE DEFOGGING DEVICE

CROSS REFERENCE TO RELATED APPLICATION

This application claims priority based on provisional U.S. patent application Ser. No. 60/157,547 filed on Oct. 4, 1999.

FIELD OF INVENTION

The present invention relates to the removal of fog or moisture in multi-paned windows. In particular, the present invention provides for the easy removal of moisture trapped in double-pane aircraft windows.

BACKGROUND OF INVENTION

The fuselage of aircrafts typically contain double-paned windows wherein two window panes are spaced apart from one another. A window seal surrounds the outer perimeter of the window panes thereby enclosing the space between the window panes. The outer surface of the inner window pane is exposed to the cabin area and the outer surface of the outer window pane is subjected to the environment outside of the aircraft. In order to achieve a pressure equalization in the window during flight, a ventilation hole is provided at or near the bottom of the inner window pane. This ventilation hole allows the exchange of air to take place between the pressurized cabin interior and the enclosed window space. For example, if the pressure in the cabin is greater than the pressure in the enclosed window space, then air will flow from the cabin into the enclosed space and achieve a pressure equalization.

The outer window pane may be subjected to temperatures as low as −30° C. during flight. As a result, water vapor present in the cabin air that flows into the enclosed window space will condense on the inner surface of the outer window pane. The outer window pane will become fogged by condensation providing little or no visibility for the aircraft passenger. The condensation on the window pane may even form into a layer of frost or ice due to the low external temperatures during the flight. As the aircraft then descends into warmer air strata, the frost or ice layer within the enclosed window space will melt, forming fog or water droplets on the window panes, and in the extreme situation even causing the accumulation or puddling of condensed water at the bottom of the enclosed space. Greater condensation will occur as the relative humidity of the interior cabin air increases, which is dependent upon the flight conditions of the aircraft. For example, the relative humidity may be affected by the number of passengers in the aircraft and the location and climatic conditions of the flight.

Currently, in order to remove moisture that accumulates in the enclosed window space, it is necessary to disassemble the window unit and clean and/or replace the window panes. This is typically a very costly and time consuming procedure.

SUMMARY OF INVENTION

The present invention solves the above-described problem by providing a defog device that easily defogs multi-paned windows comprising a source of low moisture gas, a flexible conduit for introducing the low moisture gas into the enclosed space between the window panes, and a regulator to control the flow of gas through the flexible conduit and into the enclosed space. The low moisture gas is preferably nitrogen. The flow of low moisture gas causes any condensation in the enclosed space to evaporate and be carried out of the enclosed space with the gas. This device is especially useful for defogging double-paned windows of aircrafts, but may be used to remove condensation from any multi-paned window such as those found in residential, commercial and industrial structures.

More particularly, the defog device of the present invention comprises a flexible conduit which is capable of introducing low moisture gas into the enclosed window space through a ventilation hole in one of the window panes. The ventilation hole may be a drilled hole in one of the panes. The defog device may further comprise an injection tube connected to the flexible conduit for introducing low moisture gas into the enclosed space. The injection tube is also capable of introducing the gas into the enclosed window space through a ventilation hole in one of the window panes.

Still more particularly, the defog device of the present invention comprises a flexible conduit that is adapted to introduce low moisture gas into more than one multi-paned window, wherein the flexible conduit is capable of being connected to the windows in series and introducing low moisture gas into the enclosed space of each window. An attachment means and a hanging means may be used to hold the flexible conduit in place at each window.

Alternatively, the defog device of the present invention may further comprise a manifold connected to the regulated low moisture gas. At least one additional flexible conduit is connected to the manifold, wherein the additional flexible conduit is adapted to introduce low moisture gas into more than one window. Each window comprises at least two window panes and an enclosed space between the window panes. The additional flexible conduit is capable of being connected to the windows in series and introducing nitrogen gas into the enclosed space of each window.

The present invention also relates to a method of defogging a multi-paned window comprising passing a low moisture gas through a flexible conduit and into an enclosed space between at least two window panes. The flow of gas through the flexible conduit is regulated so as to remove moisture from the enclosed space. The low moisture gas may be introduced into the enclosed space through a ventilation hole in one of the window panes. Preferably, the low moisture gas is nitrogen.

An injection tube may be connected to the flexible conduit, whereby the injection tube is inserted into the enclosed window space and low moisture gas is introduced into the enclosed space through the injection tube.

More particularly, the flexible conduit is adapted to introduce low moisture gas into more than one window, wherein each window comprises at least two window panes and an enclosed space between the window panes. The step of introducing low moisture gas further comprises connecting the flexible conduit to the windows in series and introducing low moisture gas into the enclosed space of each window. The flexible conduit may be attached to one of the window panes of each window with an attachment means and a hanging means.

A plurality of injection tubes may be connected to the flexible conduit, whereby the method further comprises inserting each injection tube into an enclosed window space and introducing low moisture gas through each injection tube into an enclosed space.

The method of the present invention may further comprise connecting a manifold to the regulated low moisture gas and passing the low moisture gas through the manifold into at least one additional flexible conduit. The additional flexible conduit is adapted to introduce low moisture gas into more than one window, wherein each window comprises at least two window panes and an enclosed space between the window panes. The additional flexible conduit is connected to the windows in series and introduces low moisture gas into the enclosed space of each window.

DETAILED DESCRIPTION OF THE INVENTION

Figure 1:
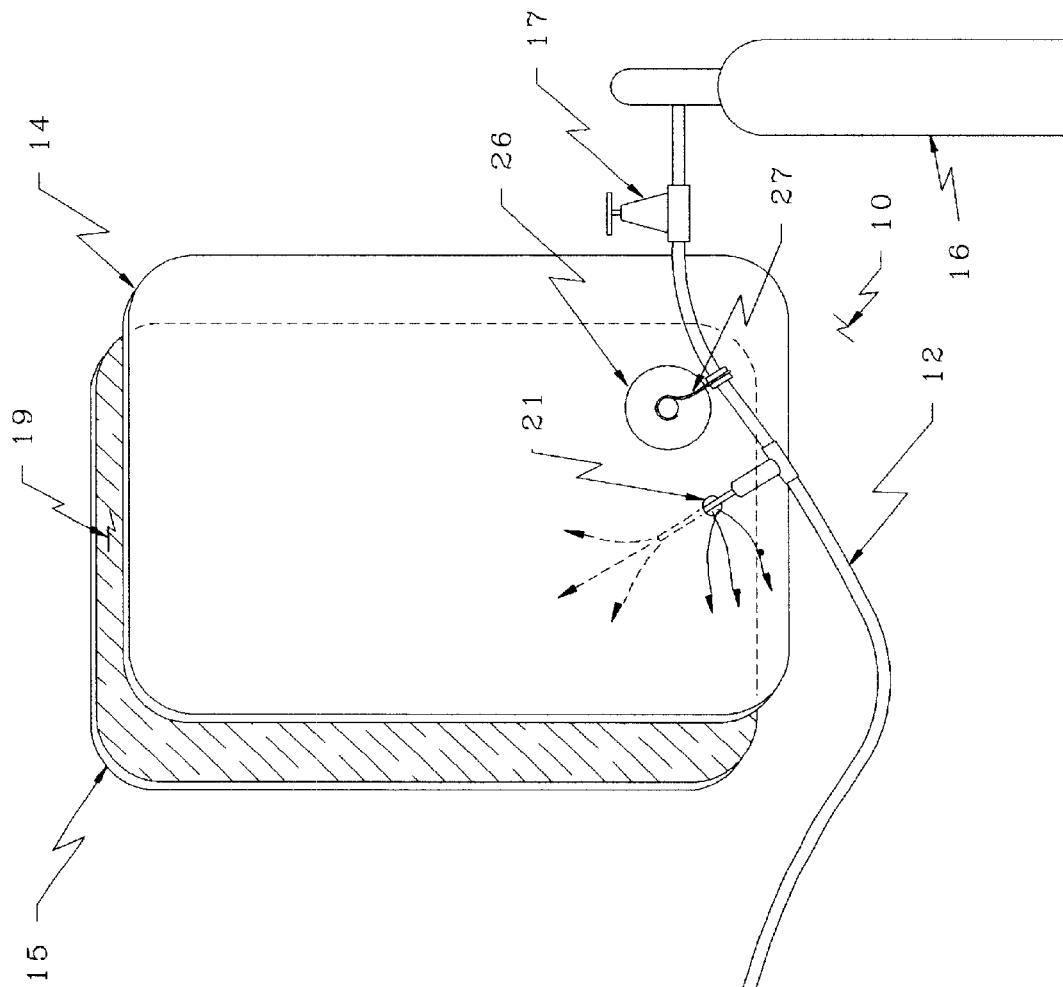
FIG. 1 is an elevation view of a defog device made in accordance with an embodiment of this invention.
Figure 2:
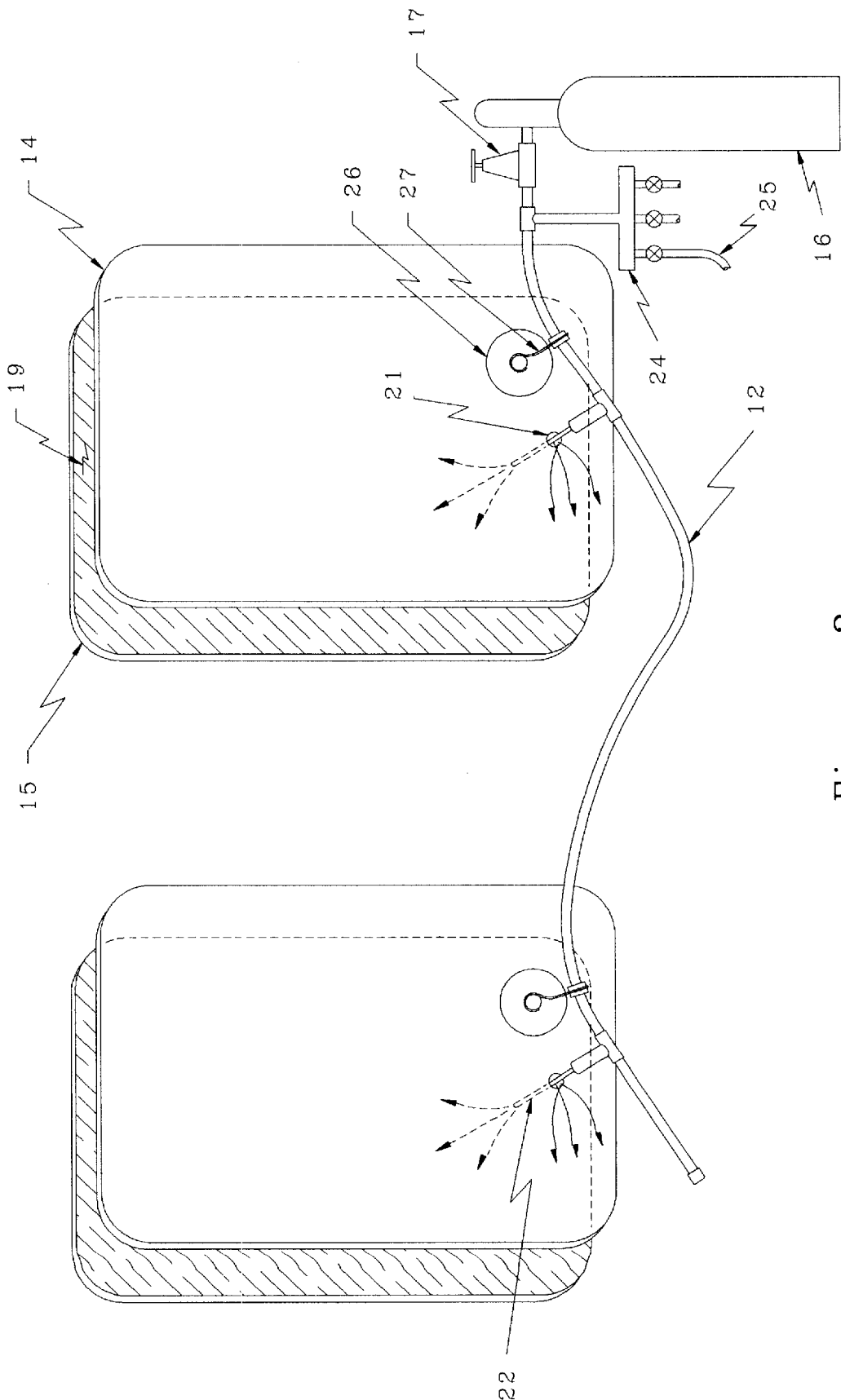
FIG. 2 is an elevation view of a defog device made in accordance with an alternative embodiment of this invention.

Referring to FIGS. 1 and 2, shown is a defog device 10 for a multi-paned window which includes a flexible conduit 12 for introducing low moisture gas into an enclosed space between at least two window panes 14 and 15, a source of low moisture gas 16, and a regulator 17 for controlling the flow of low moisture gas through the flexible conduit.

The multi-paned window illustrated in FIGS. 1 and 2 comprises an inner pane 14 and an outer pane 15. A seal 19 surrounds the perimeter of the inner pane 14 and outer pane 15 forming an enclosed space therebetween. In an aircraft, for example, the inner pane 14 is exposed to atmosphere inside of the aircraft cabin while the outer pane 15 is subjected to the cold temperatures of the environment outside of the aircraft. The inner pane 14 typically contains a ventilation hole 21 located near the bottom of the pane. The ventilation hole 21 provides for the exchange of air between the cabin interior and the enclosed window space allowing the pressure to be equalized between these two areas. This is particularly important during the climb and descent phases of a flight.

However, pressurized cabin air containing water vapor may pass through the ventilation hole 21 as well as through gaps in the enclosed space. Since the outer pane 15 is at lower temperature than the cabin air passing into the enclosed window space, vapor in the air will condense on the inner surface of the outer pane 15. As a result, the outer pane 15 becomes fogged with condensation.

The defog device of the present invention introduces a low moisture gas into the enclosed window space through a flexible conduit 12. The flow of low moisture gas into the enclosed window space causes any condensation in the enclosed space to evaporate and be carried out of the space with the gas.

The flexible conduit 12 may be constructed from a variety of materials including, but not limited to rubber and plastic such as polyethylene, polypropylene and polyvinylchloride. Preferably, the flexible conduit 12 is made of plastic. It is also preferred that the flexible conduit 12 be capable of introducing the low moisture gas through the ventilation hole 21 in the inner pane 14. The ventilation hole 21 may be a drilled hole in one of the window panes 14 and 15. If a ventilation hole 21 is not present in one of the window panes, the low moisture gas may be introduced through any opening large enough to allow an adequate flow of low moisture gas into the enclosed window space to remove the condensation.

Alternatively, an injection tube 22 may be connected to the flexible conduit 12 for introducing low moisture gas into the enclosed space. The injection tube 22 may be connected to the flexible conduit 12, for example, through the use of a T-coupling or similar type fitting. It is also preferable that the injection tube 22 be capable of introducing low moisture gas through the ventilation hole 21. However, if a ventilation hole 21 is not present in one of the window panes, the low moisture gas may be introduced through any other opening in the enclosed window space.

The injection tube 22 may be flexible or rigid and may be constructed of any material, including, but not limited to rubber, plastic, flexible catheter tubing and metal. For instance, the injection tube 22 may be a catheter, or a needle such as a curved hypodermic needle.

Any non-oxidizing gas having a low water vapor content may serve as the source of low moisture gas 16 in the present invention. Gases which may be used include, but are not limited to air, nitrogen, argon, helium and carbon dioxide.

A regulator 17 controls the flow of low moisture gas through the flexible conduit 12 and into the enclosed window space so that the flow of gas is adequate to remove moisture from the enclosed space. The regulator of the present invention may be any regulator known to those having ordinary skill in the art. Preferably, the regulator 17 maintains the pressure of the low moisture gas in the flexible conduit 12 between about 2 psi to about 25 psi.

As FIG. 1 indicates, the flexible conduit 12 may be adapted to introduce low moisture gas into more than one multi-paned window. The flexible conduit 12 may be connected to the windows in series and include as many windows as necessary to complete the defogging operation. The low moisture gas is introduced through the enclosed space between the window panes 14 and 15 in each window.

A plurality of injection tubes 22 may be connected to the flexible conduit 12 wherein the low moisture gas is introduced into the enclosed space of each window through a respective injection tube.

FIG. 2 illustrates another embodiment of the present invention wherein a manifold system is used to introduce low moisture gas into a plurality of multi-paned windows. In this embodiment, the defog device comprises a manifold 24 connected to the regulated low moisture gas, and at least one additional flexible conduit 25 connected to the manifold. The additional flexible conduit 25 is adapted to introduce low moisture gas into the enclosed space of more than one window. The additional flexible conduit 25 is capable of being connected to the windows in series and introducing low moisture gas into the enclosed space of each window. The manifold system is useful for maintaining the pressure in the flexible conduits 12 and 25 between 2 psi and 25 psi when there are a large number of windows involved in the defogging process. The manifold system is also helpful, for instance, when there are windows to be defogged in various locations in a structure.

The additional flexible conduit 25 may be constructed of the same materials as the flexible conduit 12.

Whenever low moisture gas is being introduced into the enclosed space of more than one multi-paned window, the defog device of the present invention may further comprise a plurality of attachment means 26 and a plurality of hanging means 27. Each attachment means 25 is capable of being attached to one of the window panes of each window and is preferably attached to the inner window pane 14. The attachment means may be any device capable of being attached to the window pane, including, but not limited to a suction cup, glue and tape. It is preferable that the attachment means is a suction cup. Each hanging means 27 is connected to an attachment means 26 and performs the function of holding the flexible conduits 12 and 15 in place next to each window. Examples of appropriate hanging means include, but are not limited to hooks, wire or plastic attachments. The shape and material of construction for the hanging means 27 is not important so long as they are constructed to adequately hold the flexible conduits 12 and 15 in place.

The attachment means 26 and hanging means 27 may be one unit or they may be two separate pieces that are connected together. The flexible conduits 12 and 25 may be held in place directly by the attachment means 26 without the hanging means 27. For instance, the attachment means 26 may comprise an adhesive surface for attachment to the flexible conduits 12 and 25.

The present invention also relates to a method of defogging a multi-paned window comprising passing a low moisture gas through a flexible conduit and into an enclosed space between at least two window panes. The flow of gas through the flexible conduit 12 is regulated so as to remove moisture from the enclosed space. The low moisture gas may be introduced into the enclosed space through a ventilation hole 21 in one of the window panes 14 and 15. The ventilation hole 21 may be a drilled hole. If a ventilation hole 21 is not present, the method may further comprise drilling a hole in one of the window panes 14 and 15 to permit access to the enclosed window space.

An injection tube 22 may be connected to the flexible conduit 12, whereby the injection tube is inserted into the enclosed window space and low moisture gas is introduced into the enclosed space through the injection tube.

The flexible conduit 12 may be adapted to introduce low moisture gas into more than one window, wherein each window comprises at least two window panes 14 and 15 and an enclosed space between the window panes. The step of introducing low moisture gas further comprises connecting the flexible conduit 12 to the windows in series and introducing low moisture gas into the enclosed space of each window. The flexible conduit 12 may be attached to one of the window panes 14 and 15 of each window with an attachment means 25 and/or hanging means 26.

A plurality of injection tubes 22 may be connected to the flexible conduit 12, whereby the method further comprises inserting each injection tube into an enclosed space and introducing low moisture gas through each injection tube into an enclosed space.

The method of the present invention also may further comprise connecting a manifold 24 to the regulated low moisture gas and passing the low moisture gas into at least one additional flexible conduit 25. The additional flexible conduit 25 is connected in series to more than one window and introduces low moisture gas into the enclosed space of each window. The additional flexible conduit 25 may be attached to one of the window panes 14 and 15 of each window with an attachment means 26 and/or hanging means 27.

It should be understood that the foregoing relates to particular embodiment of the present invention, and that numerous changes may be made therein without departing from the scope of the invention as defined by the following claims.

We claim:

1. A portable defogging device for a multi-paned window comprising:
   a flexible conduit for temporarily introducing nitrogen gas into an enclosed space between two window panes;
   a source of nitrogen gas; and
   a regulator to control the flow of nitrogen through the flexible conduit; wherein said flexible conduit, said source of nitrogen gas and said regulator is a portable self-contained device to provide defogging through an open loop system to previously fogged multi-paned windows wherein the defogging device is deactivated and removed from the window to complete the defogging cycle.

2. The portable defogging device of claim 1 wherein the flexible conduit is capable of temporarily introducing nitrogen gas utilizing an open loop system into the enclosed space through a ventilation hole in one of the previously fogged multi-window panes, after which the defogging device is deactivated and removed from the window to complete the defogging cycle.

3. The portable defogging device of claim 1 wherein the flexible conduit is made of any bendable material.

4. The portable defogging device of claim 1, further comprising a needle, catheter or any hollow rigid means attached to the flexible conduit for temporarily introducing the nitrogen gas into the enclosed space.

5. The portable defogging device of claim 4, wherein the needle, catheter or any hollow rigid means is capable of temporarily introducing the nitrogen gas into the enclosed space through a ventilation hole in one of the window panes.

6. The portable defogging device of claim 5, wherein the needle is a hypodermic needle or any hollow rigid means.

7. The portable defogging device of claim 1, wherein the flexible conduit is adapted to temporarily introduce the nitrogen gas into more than one window, wherein each window comprises two window panes and an enclosed space between the window panes, and wherein the flexible conduit is capable of being connected to the windows in series and temporarily introducing nitrogen gas into the enclosed space of each window.

8. The portable defogging device of claim 7, further comprising:
   a plurality of attachment means wherein each attachment means is capable of being attached to one of the window panes of each window; and a plurality of hanging means for holding the flexible conduit wherein each hanging means is attached to a suction means.

9. The portable defogging device of claim 8, wherein the attachment means is a suction cup.

10. The portable defogging device of claim 1, wherein the window is a window in an aircraft, residential, commercial or industrial structure, wherein the low moisture gas is temporarily introduced into the enclosed space through a hole in one of the windows.

11. The portable defogging device of claim 7, further comprising:
   a manifold connected to the regulated nitrogen gas; and
   at least one additional flexible conduit connected to the manifold, wherein the additional flexible conduit is adapted to temporarily introduce the nitrogen gas into more than one window, wherein each window comprises two window panes and an enclosed space between the window panes, and wherein the additional flexible conduit is capable of being connected to the windows in series and temporarily introducing nitrogen gas into the enclosed space of each window.

12. The portable defogging device of claim 11, wherein each flexible conduit is capable of introducing the nitrogen gas through a ventilation hole in one of the window panes of each window.

13. A portable defogging device for a multi-paned window comprising:

a flexible conduit for temporarily introducing low moisture gas into an enclosed space between at least two window panes;

a source of low moisture gas; and a regulator to control the flow of low moisture gas through the flexible conduit; wherein said flexible conduit said source of low moisture gas and said regulator are portable to provide defogging to previously fogged multi-paned windows wherein the defogging device is deactivated and removed from the window to complete the defogging cycle.

14. The portable defogging device of claim 13, wherein the flexible conduit is capable of introducing the low moisture gas utilizing an open loop system into the enclosed space through a ventilation hole in one of the window panes.

15. The portable defogging device of claim 13, further comprising an injection tube connected to the flexible conduit for temporarily introducing the low moisture gas into the enclosed space.

16. The portable defogging device of claim 15, wherein the injection tube is capable of temporarily introducing the low moisture gas into the enclosed space through a ventilation hole in one of the window panes.

17. The portable defogging device of claim 15, wherein the injection tube is flexible or rigid.

18. The portable defogging device of claim 13, wherein the low moisture gas is selected from the group consisting of air, nitrogen, argon, helium, and carbon dioxide.

19. The portable defogging device of claim 13, wherein the flexible conduit is adapted to temporarily introduce low moisture gas into more than one window, wherein each window comprises at least two window panes and an enclosed space between the window panes, and wherein the flexible conduit is capable of being connected to the windows in series and temporarily introducing low moisture gas into the enclosed space of each window.

20. The portable defogging device of claim 19, further comprising:

a plurality of attachment means wherein each attachment means is capable of being attached to one of the window panes of each window; and a plurality of hanging means for holding the flexible conduit wherein each hanging means is attached to a suction means.

21. The portable defogging device of claim 20, wherein the attachment means is a suction cup.

22. The portable defogging device of claim 13, wherein the window is a window in an aircraft, residential, commercial or industrial structure.

23. The portable defogging device of claim 19, further comprising:

a manifold connected to the regulated low moisture gas; and at least one additional flexible conduit connected to the manifold, wherein the additional flexible conduit is adapted to temporarily introduce the low moisture gas into more than one window, wherein each window comprises at least two window panes and an enclosed space between the window panes, and wherein the additional flexible conduit is capable of being connected to the windows in series and temporarily introducing low moisture gas into the enclosed space of each window.

24. The portable defogging device of claim 22, wherein each flexible conduit is capable of temporarily introducing the low moisture gas through a hole in one of the window panes of each window.

25. A method of defogging a multi-paned window comprising:

using a portable defogging device with an open loop system to temporarily introduce nitrogen gas into an enclosed space between two window panes through a flexible conduit thereby removing previously accumulated moisture from the enclosed space between the multi-paned windows, wherein the defogging device is deactivated and removed from the window to complete the defogging cycle.

26. The method of claim 25, wherein a needle or any hollow rigid means is connected to the flexible conduit, the method further comprises inserting the needle or any hollow rigid means into the enclosed space, and the step of temporarily introducing nitrogen gas further comprises temporarily introducing the nitrogen gas into the enclosed space through the needle or any hollow rigid means.

27. The method of claim 25, wherein the nitrogen gas is temporarily introduced into the enclosed space through a hole in one of the window panes.

28. The method of claim 25, further comprising controlling the flow of nitrogen gas through the flexible conduit with a regulator.

29. The method of claim 25, wherein the flexible conduit is adapted to temporarily introduce nitrogen gas into more than one window, wherein each window comprises two window panes and an enclosed space between the window panes, and wherein the step of temporarily introducing nitrogen gas further comprises connecting the flexible conduit to the windows in series and temporarily introducing nitrogen gas into the enclosed space of each window.

30. A method of defogging a multi-paned window comprising:

using a portable defogging device with an open loop system to temporarily introduce a low moisture gas into an enclosed space between at least two window panes through a flexible conduit;

and regulating the flow of gas through the flexible conduit so as to remove previously accumulated moisture from the enclosed space between the multi-paned windows, wherein the defogging device is deactivated and removed from the window to complete the defogging cycle.

31. The method of claim 30, wherein the low moisture gas is temporarily introduced into the enclosed space through a hole in one of the window panes.

32. The method of claim 30, wherein an injection tube is connected to the flexible conduit, the method further comprises inserting the injection tube into the enclosed space, and the step of temporarily introducing low moisture gas into the enclosed space through the injection tube.

33. The method of claim 30, wherein the pressure of low moisture gas in the flexible conduit is set to a constant pressure and flow rate between about 2 psi to about 25 psi.

34. The method of claim 30, wherein the low moisture gas is selected from the group consisting of air, nitrogen, argon, helium, and carbon dioxide.

35. The method of claim 30, wherein the window is a; window in a aircraft, residential, commercial or industrial structure.

36. The method of claim 30, wherein the flexible conduit is adapted to temporarily introduce low moisture gas into more than one window, with an open loop system; wherein each window comprises at least two window panes and an enclosed space between the window panes, and wherein the step of temporarily introducing low moisture gas further comprises connecting the flexible conduit to the windows in series and temporarily introducing low moisture gas into the enclosed space of each window, wherein the defogging device is deactivated and removed from the window to complete the defogging cycle.

37. The method of claim 35, wherein the flexible conduit is attached to one of the window panes of each window with an attachment means.

38. The method of claim 35, wherein a plurality of injection tubes are connected to the flexible conduit, the method further comprises inserting each injection tube into an enclosed space, and the step of temporarily introducing low moisture gas through each injection tube into an enclosed space.

39. The method of claim 35 further comprising:

connecting a manifold to the regulated low moisture gas;

passing the low moisture gas through the manifold into at least one additional flexible conduit, wherein the additional flexible conduit is adapted to temporarily introduce low moisture gas into more than one window, wherein each window comprises at least two window panes and an enclosed space between the window panes, and wherein the method further comprises connecting the additional flexible conduit to the windows in series and temporarily introducing low moisture gas into the enclosed space of each window.

* * * * *